United States Patent
Liang et al.

(10) Patent No.: US 9,916,017 B2
(45) Date of Patent: Mar. 13, 2018

(54) SMART ERASER TO ERASE DIGITAL STROKES

(71) Applicant: ADOBE SYSTEMS INCORPORATED, San Jose, CA (US)

(72) Inventors: Mao Liang, Beijing (CN); Ning Li, Beijing (CN); Michael Andrew McHugh, San Jose, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 16 days.

(21) Appl. No.: 14/323,486

(22) Filed: Jul. 3, 2014

(65) Prior Publication Data
US 2016/0005205 A1 Jan. 7, 2016

(51) Int. Cl.
*G06F 17/00* (2006.01)
*G06F 3/0354* (2013.01)
*G06F 3/0488* (2013.01)
*G06F 3/0484* (2013.01)

(52) U.S. Cl.
CPC ...... *G06F 3/03545* (2013.01); *G06F 3/04842* (2013.01); *G06F 3/04883* (2013.01)

(58) Field of Classification Search
None
See application file for complete search history.

(56) References Cited

U.S. PATENT DOCUMENTS

| 8,270,764 B1* | 9/2012 | Agarwala | G06T 11/60 345/629 |
| 2008/0036789 A1* | 2/2008 | de Leon | H04N 1/00183 345/625 |
| 2011/0007076 A1* | 1/2011 | Nielsen | G06F 17/30241 345/441 |
| 2012/0206471 A1* | 8/2012 | Sarnoff | G06T 11/60 345/581 |
| 2013/0222385 A1* | 8/2013 | Dorsey | G06T 11/20 345/427 |
| 2014/0055399 A1* | 2/2014 | Lee | G06F 3/03 345/173 |

OTHER PUBLICATIONS

Adobe, "Adobe Photoshop CS5", Mar. 14, 2012, URL: http://web.archive.org/web/20120314063310/http://www.adobe.com/products/photoshop.html.*
Mediacollege.com, "Photoshop Eraser Tool", Mar. 14, 2012, URL: http://www.mediacollege.com/adobe/photoshop/tool/eraser.html.*
Infinite_resolution, "Mystereies of the Eraser Tool—Revealed!", Apr. 22, 2009, URL: http://blogs.adobe.com/adobeillustrator/2009/04/mysteries_of_the_eraser_tool_r.html.*
PCMAG, "Adobe Photoshop Touch 1.3 (for iPad)", Sep. 11, 2012, URL: http://www.pcmag.com/article2/0,2817,2403607,00.asp.*
Martin Perhinak, "10 Things You Need to Know About Working with Vectors in Photoshop", 2013, URL: http://design.tutsplus.com/tutorials/10-things-you-need-to-know-about-working-with-vectors-in-photoshop--psd-31513.*
Smith, "Layers in Photoshop", 2008, URL: http://web.archive.org/web/20081014123211/http://www.photoshopcafe.com/tutorials/layers/Layers.htm.*

* cited by examiner

*Primary Examiner* — David H Chu
(74) *Attorney, Agent, or Firm* — Shook, Hardy & Bacon L.L.P.

(57) ABSTRACT

Embodiments of the present invention provide systems, methods, and computer storage media directed to a smart eraser. As such, a particular drawing stroke on a canvas or background can be erased without erasing other strokes overlapping with the eraser path. In some implementations, smart eraser functionality can be triggered by beginning an eraser path at a point that coincides with the stroke to which the smart eraser functionality is to be applied.

20 Claims, 6 Drawing Sheets

IDENTIFY A STROKE FOR WHICH TO APPLY SMART ERASING FUNCTIONALITY — 602

ERASE ONLY THE IDENTIFIED STROKE AS AN ERASER PATH OVERLAPS THE IDENTIFIED STROKE — 604

SMART ERASER TO ERASE DIGITAL STROKES

BACKGROUND

Some drawing services, such as the ADOBE IDEAS, have been developed that provide mechanisms for users to generate drawings or sketches in an electronic format. Many electronic drawing services enable a user to generate a drawing using strokes represented by, for example, bitmaps or vector graphics (e.g., points, lines, curves, shapes, polygons, etc.). Such drawing services generally include an eraser tool that enables a user to digitally erase at least a portion of a drawing to attain a drawing more desirable to the user. Traditional digital erasers, however, erase all drawing strokes underneath the eraser. That is, all vector graphics drawn on a canvas or background that fall underneath an eraser are erased.

SUMMARY

Embodiments of the present invention relate to a smart eraser that enables erasing or removing a particular drawing stroke on a canvas or background without erasing other underlying, or even overlaying, drawing strokes. In this way, a user can erase a desired stroke within a drawing without erasing other strokes performed by the user. In some implementations, by initially selecting a drawing stroke when the smart eraser is applied, the particular stroke selected is erased as the eraser moves along an erasing path without erasing underlying and/or overlaying strokes.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, drawing strokes generated by a user within a drawing application do not turn out as intended or desired by a user. As such, many drawing applications include an erasing tool that enables a user to erase aspects of a drawing. For example, to assist in the editing of drawings, ADOBE IDEAS includes an erasing tool that provides a mechanism to erase strokes provided by a user. As such, a user can edit drawings in accordance with the user's preferences to obtain drawings or sketches commensurate with the user's expectations or desires.

Figure 1A:
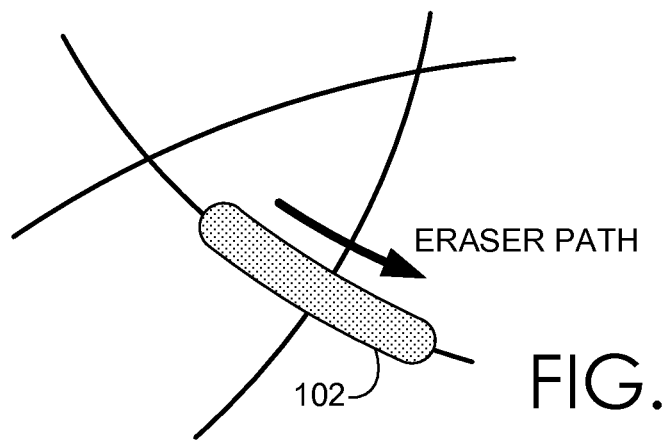
FIG. 1A illustrates an eraser path input by a user.
Figure 1B:
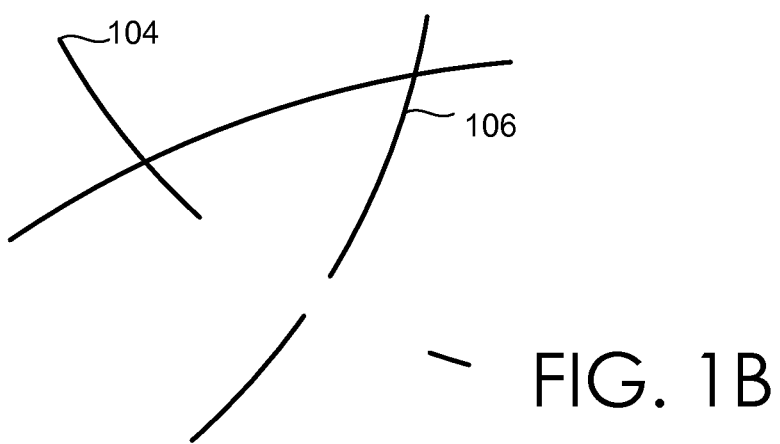
FIG. 1B illustrates strokes erased in accordance with an eraser path in a conventional implementation.

With conventional erasing tools, when an eraser tool is initiated, all strokes that fall underneath the eraser path are erased. For example, as illustrated in FIGS. 1A and 1B, when a user moves an eraser along an eraser path 102 of FIG. 1A, the stroke portions underlying the eraser path 102 are erased or removed including portions of stroke 104 and stroke 106 of FIG. 1B.

Embodiments of the present invention are directed to facilitating erasing a particular drawing stroke without erasing underlying and/or overlying drawing strokes. In this regard, a user can effectuate erasure of a specific drawing stroke without impacting other strokes according to the liking or preference of the user. In accordance with implementations described herein, the user can specify the specific drawing stroke to erase by initially selecting the stroke at the beginning of the erasure. Upon selecting a specific drawing stroke, only the specified drawing stroke is erased as the eraser path aligns with the stroke. By comparison, when a non-stroke aspect of the drawing, such as the background or canvas, is initially selected in a smart erasing mode, any drawing stroke(s) falling underneath the eraser path are erased. As such, using a smart eraser, the user may control whether a specific drawing stroke or all drawing strokes aligning with an eraser path are erased.

Figure 2A:
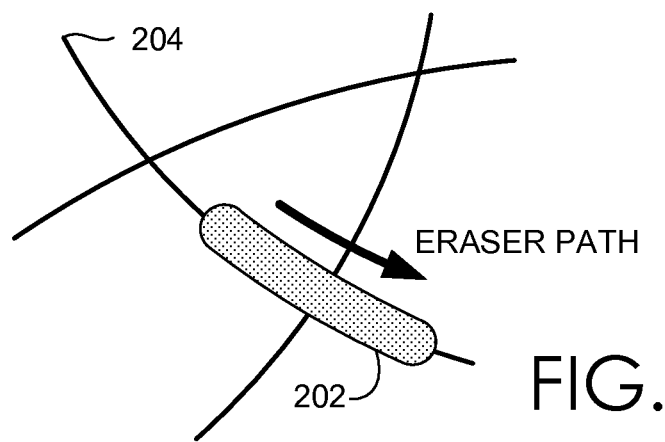
FIG. 2A illustrates an eraser path input by a user in accordance with embodiments of the present invention.
Figure 2B:
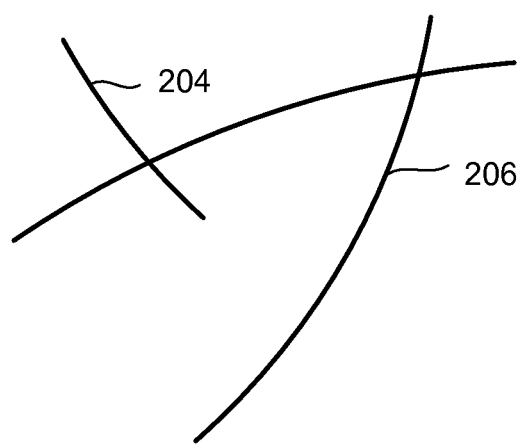
FIG. 2B illustrates a single stroke erased in accordance with an eraser path, according to embodiments of the present invention.

By way of example, and with reference to FIGS. 2A and 2B, assume that a smart eraser tool is initiated. Further assume that a user moves an eraser along an eraser path 202 of FIG. 2A that aligns with drawing stroke 204. In accordance with embodiments of the present invention, only the drawing stroke underlying the eraser path 202 is erased or removed. That is, as shown in FIG. 2B, only drawing stroke 204 is erased while drawing stroke 206 remains unaffected by the eraser path 202 (even though the eraser path overlapped or intersected with drawing stroke 204).

Although the description provided herein is generally directed to an eraser tool within a drawing application or service, as can be appreciated, the smart eraser described herein could be used in association with other types of applications or services, such as photo editing applications, electronic documents, or the like. As such, in addition to a drawing environment, smart eraser may be implemented in any number of environments including any non-drawing environment including, for example, images, web content, text, photographs, documents, or the like.

Accordingly, in one aspect, an embodiment of the present invention is directed to one or more computer storage media storing computer-useable instructions that, when used by one or more computing devices, cause the one or more computing devices to perform operations. The operations include identifying a stroke at least a portion of which is desired to be erased without erasing underlying or overlaying strokes. The operations also include erasing only the identified stroke as an eraser path overlaps the at least the portion of the stroke without erasing underlying or overlaying strokes that overlap with the eraser path.

In another embodiment of the invention, an aspect is directed to a method. The method includes determining, via a computing device, that an eraser path is initiated at a location that coincides with a stroke. The method also includes erasing only the stroke as the eraser path overlaps with the stroke, wherein one or more other strokes overlapping with the eraser path are not erased.

A further embodiment is directed to one or more computer storage media storing computer-useable instructions that, when used by one or more computing devices, cause the one or more computing devices to perform operations. The operations include determining if an eraser path is initiated at a location that coincides with a most recently captured stroke. If the eraser path is initiated at the location coinciding with the most recently captured stroke, only the most recently captured stroke is erased as the eraser path traverses the most recently captured stroke, and one or more other strokes overlapping with the eraser path are not erased. If the eraser path is not initiated at the location coinciding with the most recently captured stroke, the most recently captured stroke is erased as the eraser path traverses the most recently captured stroke and the one or more other strokes overlapping with the eraser path are erased.

Figure 3:
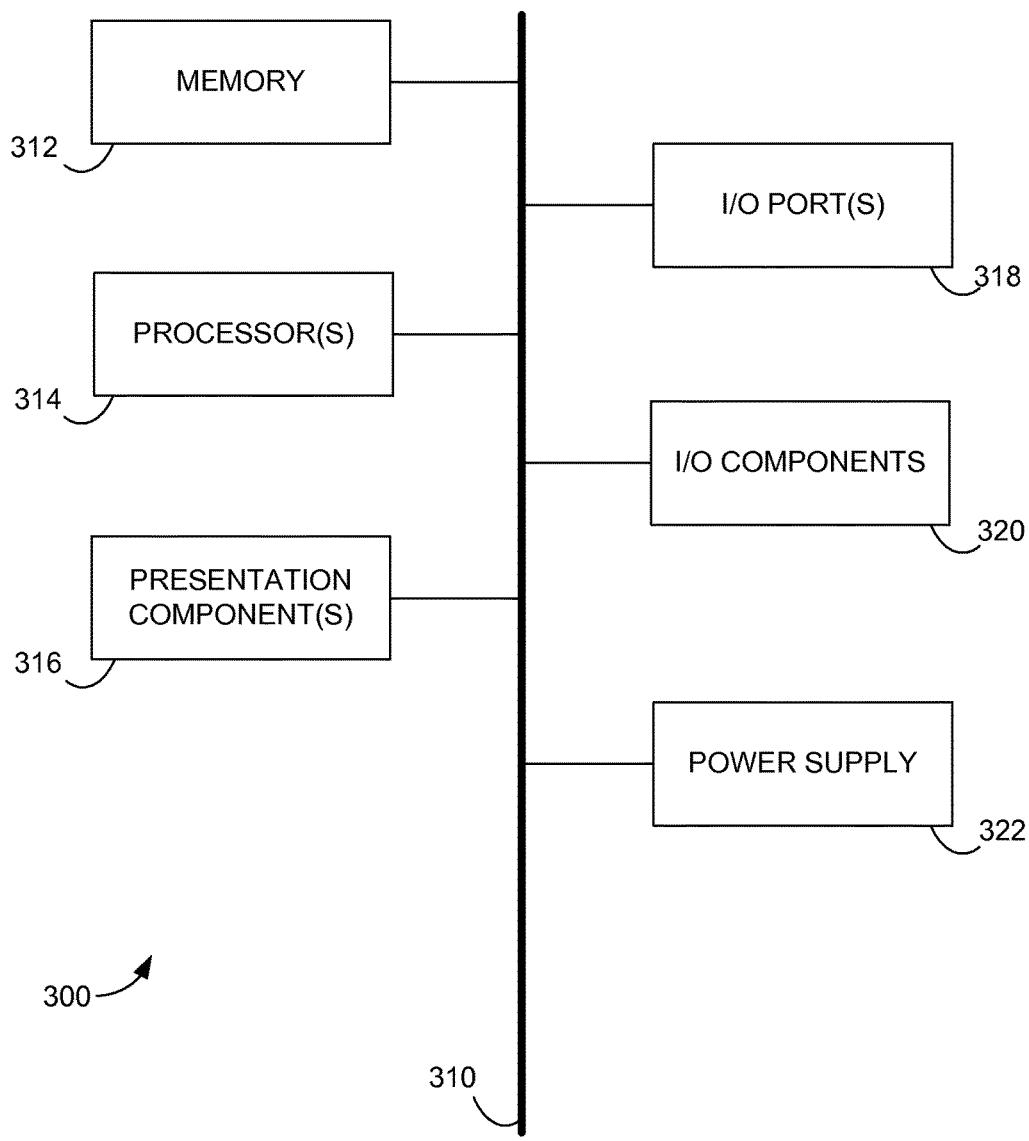
FIG. 3 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 3 in particular, an exemplary operating environment for implementing embodiments of the present invention is shown and designated generally as computing device 300. Computing device 300 is but one example of a suitable computing environment and is not intended to suggest any limitation as to the scope of use or functionality of the invention. Neither should the computing device 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 3, computing device 300 includes a bus 310 that directly or indirectly couples the following devices: memory 312, one or more processors 314, one or more presentation components 316, input/output (I/O) ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing device."

Computing device 300 typically includes a variety of computer-readable media. Computer-readable media can be any available media that can be accessed by computing device 300 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer-storage media in the form of volatile and/or nonvolatile memory. The memory may be removable, non-removable, or a combination thereof. Exemplary hardware devices include solid-state memory, hard drives, optical-disc drives, etc. Computing device 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc. The I/O components 320 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 300. The computing device 300 may be equipped with depth cameras, such as stereoscopic camera systems, infrared camera systems, RGB camera systems, touchscreen technology, and combinations of these, for gesture detection and recognition. Additionally, the computing device 300 may be equipped with accelerometers or gyroscopes that enable detection of motion. The output of the accelerometers or gyroscopes may be provided to the display of the computing device 300 to render immersive augmented reality or virtual reality.

Figure 4:
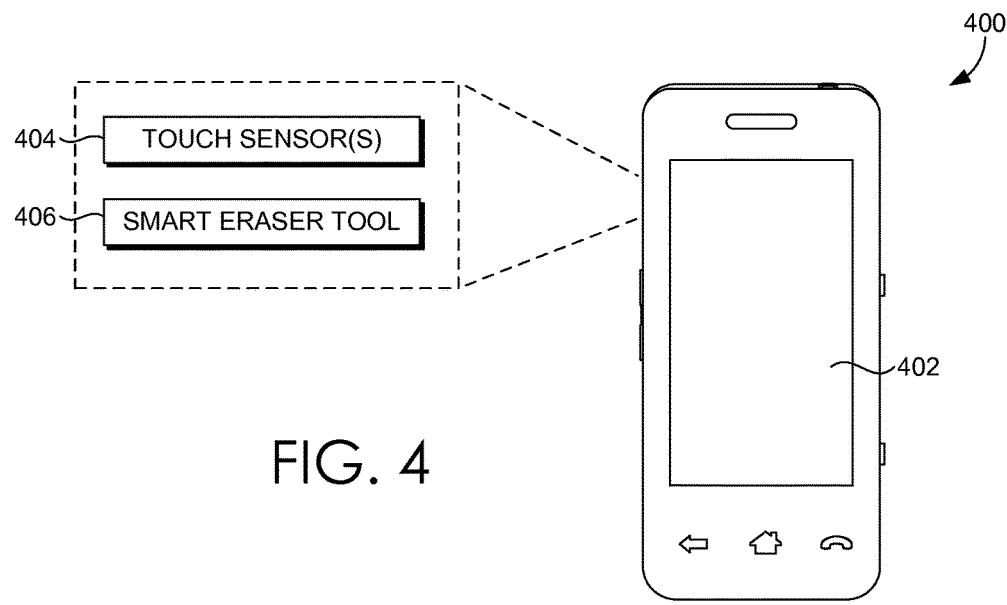
FIG. 4 is a block diagram of an exemplary computing device in which embodiments of the invention may be employed.

In accordance with embodiments of the present invention, FIG. 4 illustrates an exemplary computing device 400 that is utilized to facilitate a smart eraser. The computing device 400 can be any device associated with a display screen 402, such as the computing device 300 of FIG. 3. The display screen 402 is a screen or monitor that can visually present, display, or output information, such as, for example, drawings, sketches, images, text, figures, values, symbols, videos, video clips, movies, photographs, lists, data sets, webpages, emails, text messages, notifications, or any other content. In some embodiments, the computing device 400 is a portable or mobile device, such as a mobile phone, a personal digital assistant (PDA), a video player, a laptop, or any other portable device associated with a display screen. In some implementations, the computing device 400, such as a portable device, includes the display screen 402 (as illustrated in FIG. 4). That is, a display screen is integrated or coupled with the portable device. In other implementations, a display screen is remote from, but in communication with, the computing device.

The display screen 402 may be a touchscreen display, in accordance with embodiments described herein. A touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

As shown in FIG. 4, the exemplary computing device 400 includes a touch sensor(s) 404. A touch sensor(s) 404 may be any touch sensor(s) that detects contact or touch of an object with the touchscreen display 402 of the computing device 400. Such an object may be, for example, a user digit (e.g., a finger), a stylus, or another component that contacts a touchscreen display. A touch sensor(s) 404 may be any sensor suitable to detect an indication of touch, such as, for example, a capacitive sensor or a resistive sensor. As can be appreciated, any number of touch sensors may be utilized to detect contact with a touchscreen display.

In operation, a touch sensor detects contact of an object with at least a portion of a touchscreen display 402 of the computing device 400. A touch sensor may generate a signal based on contact with at least a portion of the touchscreen display 402 associated with the computing device 400. The signal generated by the touch sensor(s) may be communicated (e.g., directly or indirectly) to the smart eraser tool 406, or other component, such that the smart eraser tool 406 can facilitate erasing at least a portion of a drawing (e.g., a stroke or set of strokes).

In one embodiment, the touch sensor(s) 404 may be calibrated to generate a signal or communicate the signal upon exceeding a certain threshold generally accepted as being representative of sufficient contact. For example, in an instance when a touch sensor(s) 404 measures a certain threshold temperature or conductivity, the touch sensor(s) 404 may generate a signal and communicate the signal to the smart eraser tool 406. On the other hand, when the touch sensor(s) 404 does not measure the certain threshold temperature or conductivity, the touch sensor(s) 404 may fail to generate the signal or communicate the signal to the smart eraser tool 406. The touch sensor(s) 404 may be configured to generate signals based on direct human touch or touch using another object (e.g., a stylus, etc.). As can be appreciated, the sensitivity of the touch sensor(s) 404 implemented into the device 400 can affect when contact is registered or detected.

As described, the touch sensor(s) 404 transmits signals to the smart eraser tool 406 to indicate contact with the touchscreen display 402. The smart eraser tool 406 is generally configured to facilitate erasing of an aspect(s) of a drawing. As such, upon referencing signals indicating a touch event or gesture in connection with the touchscreen display 402, the smart eraser tool 406 can utilize such data to identify a manner in which to erase one or more drawing strokes and, thereafter, initiate erasure of the appropriate drawing stroke(s). In some cases, the smart eraser tool 406 is part of an application that performs the erasing functionality. For example, the smart eraser tool 406 might perform erasing functionality within drawing and/or editing software. In other cases, the smart eraser tool 406 might be distinct from an application that performs the erasing functionality. In this regard, the smart eraser tool 406 might identify a manner in which to erase one or more drawing strokes and, thereafter, communicate with an application that subsequently performs the erasing functionality. Irrespective of whether the smart eraser tool 406 or another component performs the stroke erasing, a user of the computing device 400 can view the drawing, and erasures performed in accordance therewith, via the touchscreen display 402.

Although the computing device 400 of FIG. 4 is described as a having a touchscreen display, as can be appreciated, computing devices without a touchscreen display are contemplated as within the scope of embodiments described herein. In this regard, a point(s) selected via a mouse or other selecting device can be detected and used in accordance herewith to initiate erasing of a drawing stroke(s). As another example, an air gesture can be detected and used in accordance herewith to initiate erasing of a drawing stroke(s).

Figure 5:
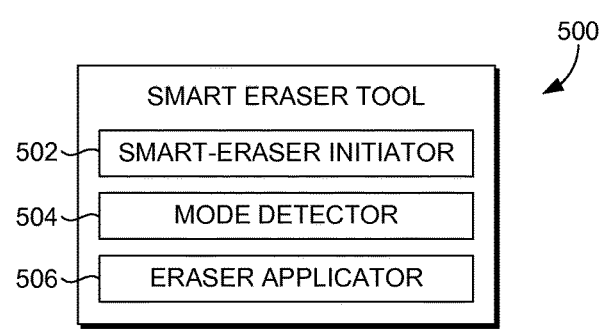
FIG. 5 is a block diagram of an exemplary smart eraser tool for facilitating erasure of strokes, in accordance with embodiments of the present invention.

Turning now to FIG. 5, a block diagram is provided illustrating an exemplary smart eraser tool 500 in which some embodiments of the present invention may be employed. The smart eraser tool 500 is generally configured to enabling erasure of a particular drawing stroke on a canvas or background without erasing other underlying and/or overlaying drawing strokes. As described in more detail below, in one implementation, one or more strokes to erase is based on a location at which an erasure is initiated. In this regard, the smart eraser tool 500 may erase varying extents of drawing strokes depending on the location or position at which the eraser path is initiated.

A stroke or drawing stroke can take on any shape or pattern, such as, for example, a rotation or circular pattern, a straight line pattern, a polygonal shape, a free-shape form, or the like. As can be appreciated, a stroke or drawing stroke can be any line or shape that can be presented over a background or canvas. Generally, a user indicates or initiates a stroke in some manner. For instance, a user may contact his or her finger on a touchscreen and move the finger around to generate a stroke. As another example, a user might move a selector around via a mouse to generate a stroke. As yet another example, a line, shape, or starting/ending points might be selected and placed on the background, e.g., via a touch event or verbal command. A stroke can have any width, length, color, etc. A background or canvas refers to a background view that can have content presented over the background. As can be appreciated, the background or canvas can be of any size, shape, color, pattern, image, etc. By way of example, a user may select a background, such as a patterned background. Upon selecting a background, a user may initiate various strokes to overlay the background. Generally, the background is not erased with a digital eraser, whereas strokes on top of a background may be erased much like pencil strokes drawn on a piece of paper can be erased but not the background piece of paper.

As shown in FIG. 5, the smart eraser tool 500 includes a smart-eraser initiator 502, a mode detector 504, and an eraser applicator 506. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The smart-eraser initiator 502 is configured to initiate the smart eraser tool. The smart eraser tool is generally configured to enable a smart eraser, that is, erasure of a particular drawing stroke on a canvas or background without erasing other underlying and/or overlaying drawing strokes. As such, the smart-eraser initiator 502 permits application of a smart eraser.

In some embodiments, the smart-eraser initiator 502 enables application of the smart eraser upon detecting a user indication to apply the smart eraser. A user might provide such an indication in any manner. For example, a user may select an "eraser" or "smart eraser" icon or setting to initiate the smart eraser. Accordingly, the smart-eraser initiator 502 might detect an indication to apply a smart eraser and, in response thereto, enable the utilization of the smart eraser tool. As can be appreciated, in some cases, a smart eraser may be implemented in addition to a separate conventional eraser functionality. In such cases, a user may have an option to select a smart eraser icon or setting to initiate the smart eraser functionality or a traditional eraser icon or setting to initiate the conventional eraser. In other cases, a smart eraser may be implemented in the alternative to a conventional eraser or in combination with a conventional eraser (e.g., specific functionality triggered by initial position of eraser path). To this end, only a single eraser option or setting may be presented.

In other embodiments, the smart-eraser initiator 502 might enable the smart eraser functionality automatically. For example, in accordance with a default setting or initiation of an application including the smart eraser, the smart-eraser initiator 502 may permit application of the smart eraser.

The mode detector 504 is configured to detect an erasing mode to apply in accordance with the smart eraser tool. In this regard, the mode detector 504 detects whether to apply a smart erasing mode or aggregate erasing mode. A smart erasing mode refers to a mode in which only a selected stroke, or stroke at which an eraser path is initiated, is erased or removed along an eraser path. An aggregate erasing mode refers to a mode in which any stroke underlying an eraser path is erased or removed.

In some embodiments, an erasing mode is detected based on a location or position selected or at which an eraser path is initiated. In this regard, whether or not a smart eraser is triggered can be based on a location or position selected or at which an eraser path is initiated. In such embodiments, when an initial location or position at which an eraser path is initiated or selected corresponds or aligns with a stroke, the smart erasing mode is detected and applied. In effect, by selecting or initiating contact with a particular stroke, the user is designating a smart erasing mode to apply in association with that specific stroke such that only that stroke is erased in accordance with an eraser path. As can be appreciated, selection or an indication of a stroke to initiate a smart erasing mode may be provided in any manner. For instance, a user may contact a touchscreen at a location of a stroke, click on a stroke using a pointer or selector, or begin an eraser path over a stroke. Selection of a stroke may be discrete from performance of an eraser path or continuous with providing an eraser path. That is, a user may provide a single contact with a stroke, remove his or her finger from the touchscreen display, and then begin a touch motion to designate an eraser path, for example. Alternatively, a user may provide an initial contact with a stroke to select the stroke (thereby initiating a smart erasing mode) and, thereafter, continue performance of the eraser path to erase the stroke without removing his or her finger until completing the eraser path.

In contrast, when an initial location or position selected or an initial location or position at which an eraser path is initiated does not correspond, align, overlay, or otherwise indicate a stroke, an aggregate erasing mode may be detected and applied. Stated differently, when a selection or an eraser path begins at a location that does not align with any stroke, such as a background or canvas, the aggregate erasing mode can be selected for utilization. As such, as an eraser path continues from only a background to over one or more strokes, any strokes occurring at the same point as the eraser path are erased.

Identifying a selected position or an initial position at which an eraser path occurs can be identified in any manner. For example, assume that a touchscreen display is being used such that a user can indicate an eraser path by moving or traversing his or her finger across the touchscreen display. In such a case, an initial contact point, for example, designated by a pixel location, coordinate location, or other location indicator can be identified. When the initial contact point aligns or overlaps with a pixel, set of pixels, or coordinates associated with a stroke, such a stroke can be designated as selected thereby initiating a smart erasing mode. When the initial contact point does not align or overlap with pixels, coordinates, or other location indicator associated with any stroke, the background or canvas can be designated as selected thereby initiating an aggregate erasing mode.

Other methods can be used to detect or determine an erasing mode to apply. For example, an erasing mode may be selected by a user for application. In such an example, a user may select, for instance, an icon indicating a smart erasing mode. Upon selecting the smart erasing mode, the smart erasing mode can be applied such that only a selected stroke is erased in accordance with an overlapping eraser path. Alternatively, a user may select an icon indicating an aggregate erasing mode. Upon selection thereof, the aggregate erasing mode can be applied such that any stroke overlapping with an eraser path is erased.

Although the smart eraser tool 500 is generally described herein as including a mode detector 504, implementations without multiple modes are contemplated within the scope of embodiments of the present invention. For example, in some implementations, a smart eraser tool may include only a smart erasing mode or functionality. That is, if a user selects to use a smart eraser, only a selected stroke underlying an eraser path is erased.

The eraser applicator 506 is configured to initiate and/or perform erasing functionality. In embodiments, the eraser applicator 506 initiates and/or erases only a selected stroke below an eraser path when a smart erasing mode is detected and initiates and/or erases any strokes below an eraser path when an aggregate erasing mode is detected. Identifying or determining content to erase can occur in any manner and are not limited to embodiments described herein.

Initially, the eraser applicator 506 may identify the eraser path, or portion thereof. That is, the eraser applicator 506, or other component in communication therewith, may detect at least a portion of an eraser path being traversed, for example, in accordance with a touch motion or contact with a touchscreen. An eraser path refers to any path designated for erasing at least a portion of content (e.g., a drawing or sketch). An eraser path can take on any shape, pattern, or form such as, for example, a rotation or circular pattern, a stroke or straight line pattern, a polygonal shape, a free-form shape, or the like.

Various contact data might be used to detect an eraser path. For example, a position indicator refers to an indication of a position, location, or area of an eraser path, or portion thereof (e.g., contact with a touchscreen display). Accordingly, a position indicator might be a pixel(s) contacted, an x and/or y coordinate associated with a point(s) of contact (e.g., an x and/or y coordinate of a pixel that corresponds with a contacted area of a touch display screen), or the like. Additional or alternative data may be used in detecting an eraser path. For example, a direction indicator refers to a direction of an eraser path. A velocity indicator refers to a velocity in which an eraser path is performed. An acceleration indicator refers to an acceleration of an eraser path. A magnitude indicator refers to a magnitude, distance, extent, displacement, or degree of an eraser path. An eraser path can be provided in any number formats including a touch gesture indicated through a touch interface, an air gesture indicated by a user made in space, or a mouse gesture indicated through a selector or cursor, or the like.

The eraser applicator 506 might receive, retrieve, or access signals from one or more touch sensors indicating touch. In embodiments, contact data might be raw data generated by one or more touch sensors, such as touch sensor(s) 404 associated with touchscreen display 402 of FIG. 4. Alternatively or additionally, contact data may be derived, calculated, identified, or determined, for example, based on raw data generated by touch sensors. That is, signals generated from touch sensors may be processed to identify contact data. By way of example only, signals received by the eraser applicator 506, or another component, can be processed to determine x and/or y coordinates identifying locations that correspond with an area of a touchscreen display contacted by an object. Any algorithm and/or lookup technique can be utilized to normalize, determine, calculate, identify, and/or derive various types of contact data.

In an aggregate erasing mode, one or more strokes that correspond or overlap with the eraser path can be detected. By way of example, and not limitation, strokes having the same or a threshold similarity of pixels or coordinates as the eraser path can be deemed as overlapping. To the extent that any strokes are deemed to overlap or coincide with the eraser path, such strokes are erased along the eraser path as the eraser path is traversed. As previously described, the eraser applicator 506 may perform the erasure or initiate erasure, for example, by providing erasure details to another component that, thereafter, performs the erasure.

In a smart erasing mode, a stroke to erase is detected. A stroke can be selected for erasure in any manner. For example, a particular stroke to be erased can be contacted by touch, hovered over, selected with a mouse, or otherwise selected. By way of example only, a stroke having a same or threshold similarity as a selected location can be deemed as selected. Such selection can be detected so that only the selected stroke is erased at points that overlap with an eraser path.

Upon detecting a stroke to erase, the portion of the stroke that corresponds or overlaps with the eraser path can be detected. By way of example, and not limitation, a selected stroke having the same or a threshold similarity of pixels or coordinates as the eraser path can be deemed as overlapping. To the extent the designated stroke is deemed to overlap or coincide with the eraser path, the stroke is erased along the eraser path as the eraser path is traversed. Any number of technologies may be used to distinguish between a selected stroke for erasure and other stroke(s) underlying an eraser path such that the specified stroke is erased while the other strokes remain unaffected. For example, layers, tags, bitmaps, coordinates, pixels, and/or the like might be used to distinguish between a selected stroke and other strokes.

In some embodiments, the eraser applicator 506 may be configured to erase only the most recent stroke provided by the user. In this regard, only the most recent stroke provided by the user can be selected for erasure. That is, prior strokes other than the most recent stroke may not be available or accessible for erasing in a smart erasing mode. In one implementation, previous strokes provided by a user can be merged into a single layer or identified as multiple previous layers, while the most recent stroke can be identified as an individual layer. As such, when a user selects to erase the stroke provided most recently by the user, the most recently provided stroke can be erased via the individual layer while the prior strokes remain on the canvas. In such an implementation, if a user attempts to select to erase a stroke previously provided by the user, such erasure of the stroke may not be permitted as the stroke has been merged with additional strokes into a single or composite layer of strokes. In another implementation, a last or most recent stroke may be identified via a bitmap including coordinates of a last stroke. Other implementations to identify a most recent stroke, or selection thereof, can be used and embodiments described herein are not intended to be limited in any manner.

Figure 6:
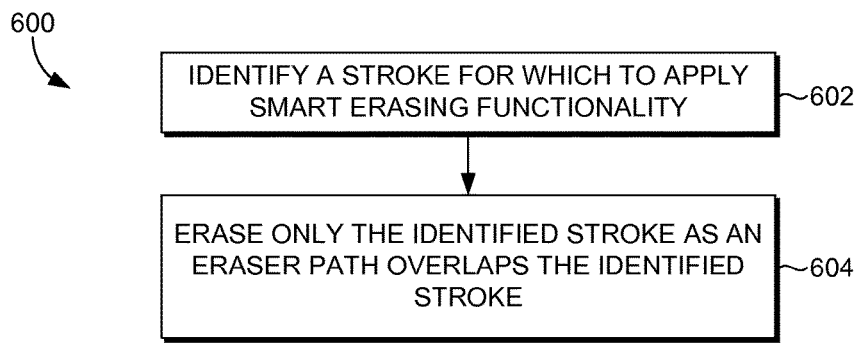
FIG. 6 is a flow diagram showing a method for facilitating performance of smart eraser functionality according to various embodiments of the present invention.

Turning now to FIG. 6, a flow diagram is provided that illustrates a method 600 for facilitating performance of smart eraser functionality, in accordance with embodiments of the present invention. Initially, as shown at block 602, a stroke for which to apply smart erasing functionality is identified. That is, a stroke desired to be erased along an eraser path without affecting underlying and/or overlaying strokes is identified or determined. A specific stroke may be selected or indicated by a user in any manner. For example, in some cases a user may click on, touch, or otherwise indicate a specific stroke. At block 604, only the identified stroke is erased as an eraser path overlaps the identified stroke. In this regard, other strokes corresponding or overlapping with the eraser path are unaffected (i.e., not removed or erased).

Figure 7:
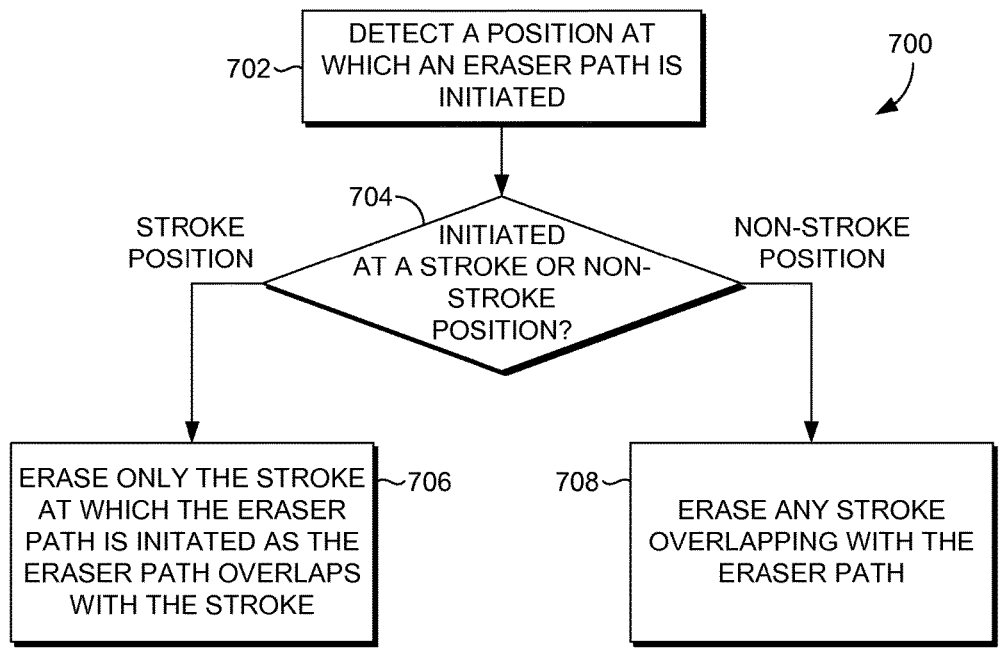
FIG. 7 is a flow diagram showing a method for triggering an eraser mode in accordance with a location at which an eraser path is initiated according to one embodiment of the present invention.

Turning now to FIG. 7, a flow diagram is provided that illustrates a method 700 for triggering an eraser mode in accordance with a location at which an eraser path is initiated, according to embodiments provided herein. Initially, at block 702, a position at which an eraser path is initiated is detected. Subsequently, at block 704, it is determined whether the eraser path is initiated at a position of a stroke or at a non-stroke position, such as a background or canvas location without having any overlaying strokes. If it is determined that the eraser path is initiated at a stroke position, only the stroke at which the eraser path is initiated is erased as the eraser path overlaps or aligns with the stroke, as indicated at block 706. In this regard, any other stroke that aligns with the eraser path is unaffected, that is, not erased. On the other hand, if it is determined that the eraser path is initiated at a non-stroke position, any stroke overlapping or aligning with the eraser path is erased, as indicated at block 708.

Figure 8:
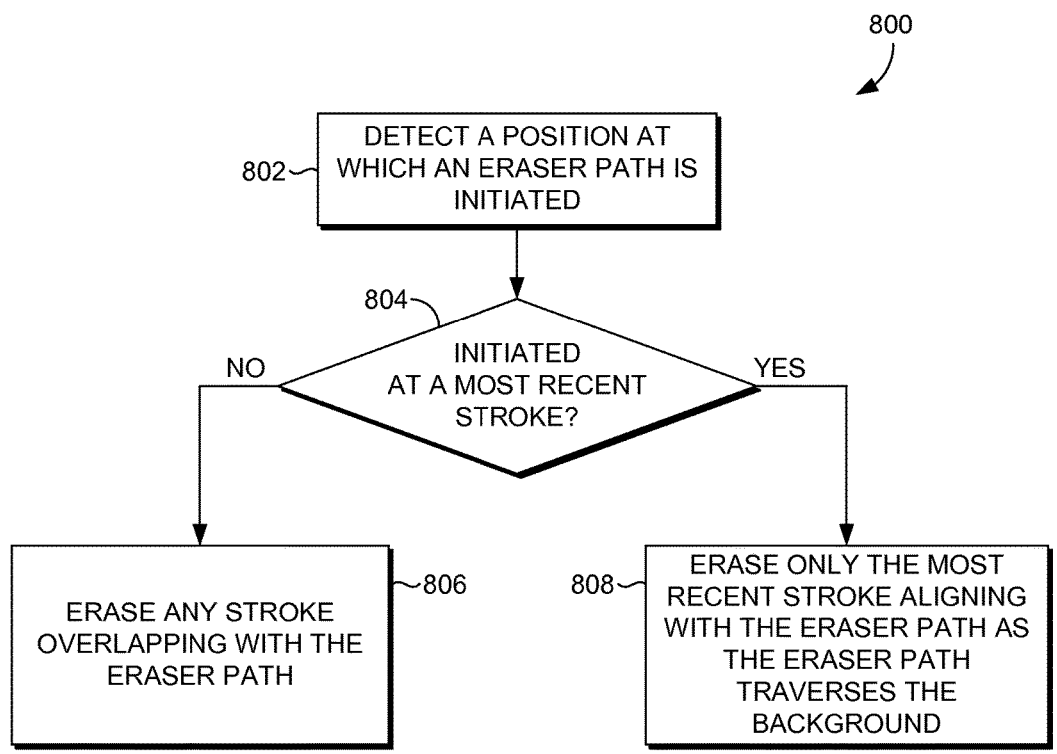
FIG. 8 is a flow diagram showing another method for triggering an eraser mode in accordance with a location at which an eraser path is initiated according to one embodiment of the present invention.

With reference now to FIG. 8, a flow diagram is provided that illustrates another method 800 for triggering an eraser mode in accordance with a location at which an eraser path is initiated, according to embodiments provided herein. Initially, as indicated at block 802, a position at which an eraser path is initiated is detected. At block 804, it is determined whether initiation of the eraser path occurred at a most recent stroke. As such, a most recent stroke, or data associated therewith, can be compared to the position at which the eraser path is initiated. Whether the eraser path is initiated at a most recent stroke can be determined using any number of technologies including, for example, layers, bitmaps, coordinates, pixel locations, tags, etc. If the eraser path is not initiated at the most recent stroke, at block 806, any stroke overlapping or aligning with the eraser path is erased as the eraser path traverses the background. As such, any stroke that overlaps with the eraser path is erased as the eraser path is generated. On the other hand, if the eraser path is initiated at the most recent stroke, at block 808, only the most recent stroke aligning with the eraser path is erased as the eraser path traverses the background.

As can be understood, embodiments of the present invention provide for, among other things, facilitating image rotation based on a user gesture. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:
   identifying a stroke for erasure as an individual layer on a canvas;
   merging other strokes that underlie or overlay the identified stroke into another layer on the canvas;
   receiving an eraser path that overlaps at least a portion of the identified stroke and a portion of the other strokes; and
   in response to receiving the eraser path, erasing the identified stroke from the canvas based on the individual layer and the other layer, wherein the other strokes remain on the canvas.

2. The one or more computer storage media of claim 1, wherein the stroke is selected by the user.

3. The one or more computer storage media of claim 2, wherein the stroke is selected by the user by initiation of the eraser path at a point that coincides with a location of the stroke.

4. The one or more computer storage media of claim 1, wherein the operations further comprising determine that the identified stroke is a most recent stroke provided by the user.

5. The one or more computer storage media of claim 1, wherein the eraser path is provided via a touch interface.

6. The one or more computer storage media of claim 1, wherein the stroke is provided by a user in association with a drawing application via a touch interface.

7. The one or more computer storage media of claim 1, wherein the operations further comprise receiving a selection to utilize a smart eraser.

8. A computer-implemented method comprising:
   determining, via a computing device, that an eraser path is initiated at a location that coincides with a stroke, wherein the stroke is identified as an individual layer on a canvas and is at least one of a line or a shape presented over a background of the canvas;
   merging one or more other strokes that are overlapping with the eraser path into another layer of the canvas; and
   based on the individual layer and the other layer of the canvas, erasing the stroke from the canvas such that the one or more other strokes remain on the canvas.

9. The method of claim 8, wherein the eraser path is initiated via a contact with a touchscreen.

10. The method of claim 8, wherein the stroke is provided to a drawing application via a touchscreen.

11. The method of claim 8 further comprising:
determining that a second eraser path is initiated at a location that does not coincide with any stroke; and
erasing any stroke overlapping with the second eraser path.

12. The method of claim 8 further comprising determining that the stroke is a most recently captured stroke.

13. The method of claim 12 further comprising:
determining that a second eraser path is initiated at a location that does not coincide with the most recently captured stroke; and
erasing any stroke overlapping with the second eraser path.

14. One or more non-transitory computer storage media storing computer-useable instructions that, when used by one or more computing devices, cause the one or more computing devices to perform operations comprising:
when an eraser path is initiated at a location coinciding with a most recently captured stroke on a canvas, merging one or more other strokes on the canvas that are overlapping with the eraser path into another layer that is separate from an individual layer of the most recently captured stroke and automatically erasing the distinguished most recently captured stroke from the canvas such that the one or more other strokes remain on the canvas; and
when the eraser path is not initiated at the location coinciding with the most recently captured stroke, as the eraser path traverses the most recently captured stroke and the one or more other strokes, automatically erasing both the most recently captured stroke and the one or more other strokes from the canvas.

15. The one or more computer storage media of claim 14, wherein the operations further comprise receiving a selection to utilize a smart eraser tool.

16. The one or more computer storage media of claim 14, wherein the operations further comprise determining whether the eraser path is initiated at the location that coincides with the most recently captured stroke based on whether the stroke is captured in the individual layer.

17. The one or more computer storage media of claim 14, wherein the operations further comprise distinguishing the most recently captured stroke from the one or more other strokes based on the individual layer of the most recently captured stroke and the other layer that is separate from the individual layer of the most recently captured stroke.

18. The one or more computer storage media of claim 14, wherein a bitmap indicates a stroke position of the most recently captured stroke.

19. The one or more computer storage media of claim 14, wherein the eraser path is initiated via a touchscreen.

20. The one or more computer storage media of claim 14, wherein the most recently captured stroke is generated via a touch gesture provided on a touchscreen.

* * * * *